United States Patent Office 3,514,373
Patented May 26, 1970

---

3,514,373
FISSIOCHEMICAL PROCESS AND FUEL
Bernard H. Hamling, Warwick, N.Y., may be granted to United States Atomic Energy Commission under the provision of 42 USC 2182
No Drawing. Continuation-in-part of applications Ser. No. 451,326, Apr. 27, 1965, and Ser. No. 456,514, May 17, 1965, both of which are continuations-in-part of application Ser. No. 320,843, Nov. 1, 1963. This application Dec. 16, 1966, Ser. No. 602,133
Int. Cl. G21c
U.S. Cl. 176—39         10 Claims

ABSTRACT OF THE DISCLOSURE

There is disclosed a fissiochemical fuel comprising the fibers of an oxide of one or more of the fissionable forms of thorium, uranium and plutonium, either alone or in combination with another metal that is either in the elemental or in the oxide form.

SPECIFICATION

This application is a continuation-in-part of application Ser. No. 451,326 filed Apr. 27, 1965, and application Ser. No. 456,514 filed May 17, 1965, both of which were continuations-in-part of application Ser. No. 320,843 filed Nov. 1, 1963. All three of said applications are now abandoned.

This invention relates to a process for producing an improved fibrous fissiochemical fuel, and a process for conducting a fissiochemical reaction using this and other fibrous fissiochemical fuels.

The development of nuclear fission reactors in recent years has created considerable interest in fissiochemistry, the direct use of fission fragment recoil kinetic energy to produce chemical reactions. One of the problems in the commercialization of fissiochemical reactions is that of providing an efficient and reuseable fuel. The fuel must be a suitable physical form of a fissionable material which, when contacted with a suitable neutron flux, is fissioned to discharge fragments having a high level of recoil kinetic energy. These highly charged fission fragments collide with the electrons of a chemically reactive fluid and are decelerated, but in turn excite and heat the reactant fluid electrons sufficiently to change the reactant molecule into a different molecular form.

Suitable fissiochemical fuels are are fissionable forms of uranium, thorium and plutonium, and include the isotopes thorium-232, uranium-233, uranium-235, uranium-238 and plutonium-239 which, upon bombardment by neutrons, yield the products of fission. These products are fission fragments, kinetic energy and fissionable isotopes.

During fission the fragment moves only a relatively short distance; for example the average range of the fission fragment is uranium-containing solid fuel is in the order of 10 to 14 microns. This means that the fuel must be so finely divided that at least one dimension is smaller than such range to permit a significant fraction of the fission fragments to escape the fuel. On the other hand, the necessity of maintaining a minimum fuel density for criticality purposes causes loss of available kinetic energy owing to re-entry of the fission fragment into adjacent fuel particles spaced too closely to one another. Each fuel form has been characterized by important limitations. For example, plated fuel elements lose half of their fission fragment energy in the supporting substrate. The art has proposed or employed such fuel forms as thin plates, spheres or rods in ordered or disordered arrays. Fuel in the form of sintered structures have been proposed, but such structures lack the fine dimensions required for intimate contact with the reactive chemical fluid.

Uranium-containing glass wool has been used as a fuel, but it sinters at relatively low temperatures on the order of 350–500° C., thereby destroying the as-charged geometry of the fiber bundle in the fuel cell. This prevents an appreciable number of the uranium fission fragments from escaping into the surrounding environment to effect molecular change of the chemical reactant. Moreover, uranium-containing glass fibers have relatively poor corrosion resistance in many reactive fluid environments, e.g., liquid fluorine. Such corrosion also destroys the essential fiber geometry in the fuel cell.

Another limitation of fission fuel-containing glass fibers is their poor radiation resistance. In the case of randomly-packed micron-size fibers for fissiochemical processes, the bulk density for the fiber pack should remain constant, even assuming that corrosion and melting are avoided. That is, the fibers should be relatively stiff, with a high modulus of elasticity and resistance to compaction. The relatively soft glass fibers tend to be displaced when contacted with a flowing chemical reactant gas under pressure, thereby forming channels through which reactant gas bypasses the fiber pack causing hot spots and loss of fission fragment kinetic energy utilization. Glass fibers also tend to become sintered and they curl and slump when exposed to radiation for sustained periods, all of which reduce the effectiveness of the glass fibers.

Another disadvantage of fissiochemical fuel-containing glass fibers is their relatively poor thermal conductivity. In fissiochemical reactions, the bulk of the released energy is degraded to heat which must be removed from the environment. Less than 30% of this energy is transferred to the chemical reactant, and utilization of even 10% of the available energy is considered to be a highly efficient process. It is thus apparent that effective means for drawing the heat away from the fibers and into a cooler medium are essential. In most fissiochemical systems, the fuel is charged into a cartridge and bombarded with neutrons in situ. The reactant fluid is passed over the fissioning fuel while the fuel is still in the cartridge, and a coolant flows in heat exchanging relation with the cartridge walls to absorb the bulk of energy degradation. Glass fibers have such low thermal conductivities that a very small fraction of this heat is conducted through the fibers to the cartridge walls. Accordingly, most of the heat must be transferred to such walls through the chemical reactant fluid. This is a rather inefficient method of heat recovery.

An object of this invention is to provide an improved process for conducting a fissiochemical reaction.

Another object is to provide an improved process using improved fissionable material-containing fibers as the fuel source.

Still another object is to provide a fissiochemical reaction process using a fiber fuel source which does not melt at relatively low temperatures and is characterized by high resistance to radiation damage.

A further object is to provide a fissionable material in fibrous form which has high corrosion resistance, high resistance to radiation damage and relatively high thermal conductivity.

Other objects and advantages will be apparent from the ensuing disclosure and appended claims.

One aspect of the invention is a process for conducting a fissiochemical reaction using as the fuel, metal oxide fibers of a member selected from the class consisting of fissionable forms of thorium, uranium and plutonium. These fibers are composed of a total of at least 80 percent by weight of oxides of one or more of the metals beryllium, magnesium, calcium, strontium, barium, scandium, yttrium, lanthanum, cerium, and other rare earth elements, titanium, zirconium, hafnium, canadium, niobium, tantalum, chromium, molybdenum, tungsten, manganese, ioron, cobalt, nickel, copper, zinc, cadmium, aluminum, gallium, tin, lead, thorium, uranium, and plutonium. The individual fibers have diameters of 1 to 25 microns and tensile strengths over 40,000 p.s.i. The fissiochemical fuel is contacted with a neutron flux sufficient to fission the fuel and discharge fission fragment recoil kinetic energy therefrom. A chemical reactant fluid is provided and contacted with a sufficient portion of the fission fragment recoil kinetic energy to change at least part of the chemical reactant into a different molecule.

Another part of this invention is directed to a process for producing composite fibers of a first elemental metal and a second metal oxide. These fibers are especially useful as the fissionable material-containing fuel of the above described process for conducting a fissiochemical reaction, although other fibrous fuels may also be used in the process.

The metal-metal oxide fibers are prepared by providing a metal compound of the first metal and a metal compound of the second metal both dissolved in a solvent such as water. The first metal is selected from the group consisting of Groups I–B, VI–B, and VIII of the Periodic Table, technetium, rhenium and zinc. The second metal is selected from fissionable forms of the group consisting of thorium, uranium and plutonium. It is preferred to use this metal in a fissionable-enriched form for greatest efficiency in the neutron bombardment and transfer of kinetic energy to the reactant fluid. An organic fiber as for example rayon is immersed in the first and second metal compounds-containing solvent thereby swelling and opening the fiber interstices such that the compounds are imbibed in the interstices. The unimbibed first and second metal compounds are removed from the outer surface of the fiber and the imbibed fiber is then dried.

The first and second metal compounds-imbibed fiber is heated to temperature between about 350° C. and 500° C. at rate sufficiently low to avoid ignition of the fiber. This first heating period is for at least one hour and sufficient duration to decompose the organic structure of the fiber and evolve at least most of the carbonaceous matter therefrom to form a fiber relic and convert at least the second metal compound to a metal oxide. At least part of this first heating step is performed in an oxygen-containing atmosphere. Next, the fiber relic is further heated at temperature of at least 300° C. and in the presence of a reducing gas so as to reduce the first metal to the elemental form while retaining the second metal in an oxide form.

In the process for conducting a fissiochemical reaction according to this invention, the fuel may comprise the above-mentioned oxides of fissionable forms of thorium, uranium and plutonium, or alternatively fibers comprising the said fissionable metal oxides and other constituents as for example the preferred first elemental metal or other metal oxides, or carbon.

The metal oxide fibers are prepared by the same general method steps as the elemental metal-metal oxide fibers except that the final reduction step is eliminated. This method then may be briefly summarized as including the steps of (a) providing a metal compound dissolved in a solvent, (b) immersing an organic fiber in the metal compound-containing solvent to impregnate or imbibe the metal compound in the opened fiber interstices, (c) heating the impregnated fiber to 350–500° C. at a rate sufficiently low to avoid ignition of the fiber but predominantly convert (pyrolyze) the organic material in the fiber to predominantly carbon, and thereafter remove the carbon as a carbon-containing gas. This heating step is at least partially performed in an oxygen-containing atmosphere and the metal compound is converted to the oxide form. There results a metal oxide fiber which has essentially the same physical shape as the original organic fiber, and consequently may be prepared in a wide variety of textile forms. They include staple fibers $\frac{1}{16}$ inch to 3.0 inches or more in length, continuous length tow, yarn and roving, woven cloth, knits, braids, felts, paper, and the like. This method is described more completely in the aforementioned parent application Ser. 320,843, incorporated herein to the extent pertinent.

Although I do not wish to be bound by same, the theory and mechanism of this process appears to be as follows: Microscopically, organic fibers such as rayon are composed of extremely small crystallites of cellulosic chains (micelles or microfibrils) held together in a matrix of amorphous cellulose. The crystallites, approximately 40 angstrom units (A.) in diameter and 250 A. long, in high-tenacity rayon yarns, are parallel to the axis of the rayon fiber and are spaced approximately 20 A. apart in the dry state. A one-denier fiber (1 gram weight per 9000 meters of length) has several million crystallites in its cross-section. When the fiber is immersed in a solvent such as water or aqueous solutions, it swells laterally opening the interstices, the amorphous regions enlarge and the crystallite spacing becomes approximately 50 A. (in the case of rayon). The dissolved selected metal compound such as a salt enters the swollen amorphous regions, which is about 85% of the volume of the swollen rayon, and becomes trapped in the amorphous regions between the crystallites when the solvent is evaporated from the fibers. The metal compounds do not crystallize upon drying of the organic fiber, as would normally occur upon drying a solution, since they are effectively suspended and separated as islands about 50 A. in size between the crystallites.

The fibers may be imbibed with two or more metal compounds from the same solvent solution, so that oxides of more than one metal may be prepared and used as the fissiochemical fuel, e.g., uranium oxide and plutonium oxide. In the first approximation, most metal compounds enter the fiber interstices in direct proportion to their solution concentration, allowing ready control of the relative loading of metal compounds in the organic fiber. Due to the blocking action of the organic crystallites, the metal compounds cannot segregate from each other nor crystallize during the drying and heat conversion steps. Since they are finely dispersed, the metal compounds and later the oxides are extremely reactive and can be made to undergo the necessary chemical reactions to form the desired metal oxide alloy product at lower temperatures than are normally required by conventional co-precipitation or powder blending methods for preparing such mixtures.

Any organic fiber can be employed as a starting material to prepare fissionable fuel-containing fibers providing it is characterized by the above-described sequence of extremely small crystallites held together in a matrix of amorphous regions which enlarge and admit the metal compounds on immersion in the solvent. Another class of fibers which are composed of long-chain molecules held together by chemical cross-links may also be used. Any cellulosic fiber can be employed including rayon, linen, saponified cellulose acetate, cotton, wood, and ramie. Other suitable organic fibers include the protein fibers (wool and silk) and the man-made acrylics, nylon, polyesters, vinyls and polyurethanes. Certain organic fibers such as polyethylene and polypropylene are not suitable for practicing the instant process because they cannot be swollen for imbibition of the metal compounds and/or the fibers melt and lose their fiber nature before the metal relic structure is formed. A preferred cellulosic fiber is rayon due to its structural uniformity, good inhibition characteristics and low impurity content.

The physical form of the metal oxide fiber product is essentially the same as and is determined by the physical form of the organic fiber starting material. During conversion of the metal compound-imbibed organic fiber to the metal oxide fiber, the length of the fiber shrinks to approximately 40 to 60 percent and the diameter to 25 to 35 percent of the original dimensions. Where a yarn composed of a multiplicity of continuous-length metal oxide fibers is desired, a continuous-filament organic yarn is employed as the starting material in the process. Similarly, where a woven organic fabric or felt composed of metal oxide fibers is desired, a woven fiber cloth or felt can be used as the starting material. Of course, metal oxide woven textiles can be made using conventional textile equipment and techniques starting with metal oxide staple fibers or yarns made by this process.

In order to obtain adequate tensile strength in the final metal oxide fiber product, cellulosic fibers are imbibed with the metal compounds to the extent of at least one-quarter mole of the metal compound(s) in each "base mole" of cellulose. The term "base mole," as used herein refers to the molecular weight of a glycosidic unit of the cellulose chain (molecular weight of 162). With non-cellulosic fibers, the concentration should be at least 0.04 gram equivalent uranium (0.1 gram equivalent nickel) in the metal compound imbibing solution per gram organic fiber. With lower concentrations of metal compound(s), insufficient metal oxide is available in the fiber relic for a strong article and the process becomes less efficient in terms of metal oxide yield per unit weight organic fiber starting material.

Imbibition or impregnation of the organic fiber can be carried out by several methods. Where the element which will appear in the final metal oxide fiber has compounds which are highly soluble in water, the imbibition step can be carried out by immersing the organic fiber in a concentrated aqueous solution of such salt.

The preferred uranium imbibing compounds are $$UO_2Cl_2$$

$UO_2(NO_3)_2$, and $UO_2(CHO)_2$; other suitable uranium compounds include $UCl_3$, $UCl_4$, $UF_6$, $UO_2Br_2$, and $$UO_2(IO_3)_2$$

Suitable plutonium imbibing compounds include $PuO_2Cl_2$, $PuO_2(NO_3)_2$, and $PuO_2(CHO)_2$. Appropriate thorium imbibing compounds include $ThCl_4$ and $$Th(NO_3)_4$$

For use as a fissiochemical fuel, the product fibers preferably contain between about 5 and 40% by weight of the fissionable metal oxide. Lower amounts do not provide sufficient recoil kinetic energy per unit weight fiber for an efficient process, and higher percentages appreciably reduce the fiber strength.

Pre-swelling the cellulosic organic fibers in water prior to immersion in concentrated imbibing solutions is preferably employed to increase both the rate and extent of salt imbibition. Water is also suitable for swelling protein fibers. For acrylic and polyester fibers, aromatic alcohols are suitable swelling agents, and the ketones are useful in swelling vinyl and polyurethane fibers for the same purpose.

Water is the preferred solvent for metal compound-imbibing of cellulosic and protein fibers such as wool and silk. Other solvents such as alcohols do not afford sufficient swelling of the fibers nor solubility of the selected metal compound for a high degree of imbibing. For vinyl and polyurethane fibers, esters and ketones are appropriate solvents, as for example normal butyl acetate or methyl ethyl ketone. For acrylic and polyester fibers, suitable solvents for the metal compound imbibition include aromatic alcohols and amines such as aniline, nitro-phenol, meta-cresol and paraphenyl-phenol.

Immersion times at normal temperatures (21–23° C.) required to give adequate imbibition vary from 30 minutes to several days depending on the salt(s) employed and the type of organic fiber employed. For example, at 21° C. water-swollen regular viscose rayon imbibes 0.9 mole $UO_2Cl_2$ per base mole rayon from 3.3 molar solution in 30 minutes. Immersion times greater than about 3 days in concentrated salt solutions are undesirable since the organic fiber may degrade, resulting in a decrease in the amount of metal compound absorbed and causing the fibers to bond to each other. When it is desired to increase the rate of imbibition of the metal compound in the organic fibers to shorten the immersion time, the metal compound solution may be heated to as high as 65° C.

Following imbibition with metal compound(s) from a solvent solution, it is necessary to remove excess solution from between the organic fibers before they dry in order to avoid bonding together of fibers by caked salt. Allowing excess unimbibed metal or hydrolysis product to remain on the fibers results in reduced strength and increased brittleness in the final metal oxide fiber product. For most cases, blotting thoroughly with absorbent paper or cloth using moderate pressure is sufficient for removing excess solution from the fibers. In addition, vacuum filtration and centrifugation have proven to be effective methods for removing excess solution from between the fibers. Raising the temperature of the wet fibers to 50–60° C. aids in removing excess solution from the fibers during blotting, vacuum filtration or centrifugation.

The metal compound-imbibed fibers are then thoroughly dried by any convenient means, such as air drying or heating in a stream of warm gas at a temperature not exceeding 70° C. It is desirable to dry the fibers rapidly (in about one hour or less) to prevent expulsion of the metal compound from the interstices of the organic fiber to its surface.

In the final step of the metal oxide fiber preparation (decomposition of the fiber organic structure), the metal compound-imbibed organic fiber is heated under controlled conditions, namely: (1) to temperature between about 350° C. and 500° C., (2) at rate sufficiently low to avoid ignition of the fiber, (3) for at least one hour, (4) for sufficient duration to decompose the organic structure of the fiber and evolve at least most of the carbonaceous matter therefrom to form a fiber relic, and (5) at least part of this heating being performed in an oxygen-containing atmosphere. The metal compound-imbibed organic fiber should not be heated above the melting point of the selected metal during this heating step. If the metal was allowed to melt, the flowing molten material would leave the decomposing organic fiber structure and prevent the formation of a metal oxide fiber relic having the same form as the original fiber.

If desired, a portion of this heating step may be performed in an inert atmosphere, e.g., nitrogen. However, at least part of this step must be in an oxygen-containing atmosphere, preferably with between 5 and about 25 volume percent oxidizing gas. The balance of the gaseous atmosphere comprises gases which are chemically non-reactive with the environment at temperatures up to 110° C. and above. Typical non-reactive gases include nitrogen, helium, argon, neon and the like. During this step, the organic fiber is pyrolyzed to carbon (carbonized), the carbon is removed as a carbon-containing gas through reaction with the oxidizing gas (volatilized), and the metal is oxidized to the metal oxide form.

It is necessary to heat the metal compound-imbibed fiber at a rate sufficiently low to avoid ignition of the fiber. If the organic fiber burns instead of carbonizes, the metal compound temperature rises excessively, due to its contiguous relation to the organic structure. Under such circumstances it is impossible to control the temperature, and the melting point of intermediate metal compounds formed may be exceeded. Also, the metal compound may be suspended in the organic compound vapors, and thus lost from the environment and unavailable to form the desired fiber relic. Also, when ignition is avoided the product fibers have smoother surfaces, are more free to bend independent of neighboring fibers, and are stronger. That is, very rapid heating and expulsion of the decomposition gases causes fiber continuity to be broken and results in excessive crystallization of the metal oxide fiber relic which in the final analysis does not yield as smooth, flexible and strong fiber products as the unignited amorphous or poorly-crystalline more dense fiber of metal oxide.

The heating rate of course is affected by the environment, e.g., inert or oxidizing, the latter being more difficult to control. It is useful, for example, to heat the fiber at a rate between 10° C. per hour and 100° C. per hour in an atmosphere containing from 5 to 25 volume percent oxygen, although higher heating rates may be satisfactory with effective means for venting the carbon-containing gas. Higher oxygen concentrations may be suitable, particularly during the later portion of the heating step. The preferred oxidizing gas is oxygen, although other oxidizing gases such as nitrogen dioxide and sulfur trioxide can be used if desired.

Microscopic voids are produced in the fibers as carbon is oxidized from the fibers. Maximum densification of the fiber is achieved by limiting the concentration of oxidizing gas and the temperature of the fiber below about 500° C. during the heating-oxidation step. This step normally requires between 1 and 48 hours to complete, depending on the metal compound(s) and resulting metal oxide or metal oxide mixture. Relatively high temperatures above 500° C. initiate crystallite formation in the fiber which weakens the end product and produces rough surfaces.

The following Examples 1–6 illustrate the preparation of metal oxide and mixed metal oxide fibers containing fissionable material, and useful as the fissiochemical fuel in the present invention.

EXAMPLE 1

$U_3O_8$ fibers 22.5 grams of 0.4 denier Tyrex viscose rayon fibers are preswelled by immersion in water for 30 minutes, blotted thoroughly and contain about 0.83 gram $H_2O$ per gram rayon. They are then immersed in an n-butyl acetate solution containing about 1.02 moles $UO_2(NO_3)_2$ per liter, for a period of one hour. After blotting thoroughly and drying the fibers in a stream of warm air, about 26.9 grams $UO_2(NO_3)_2$ are imbibed in the fibers. These fibers are placed in a tube-type furnace which is evacuated and heated to 900° C. at a rate of 50° C./hr. The carbonized fibers are then oxidized at 500° C. over a 5 hour period in an atmosphere of increasing oxygen concentration from 2% $O_2$ (98% $N_2$) to 100% $O_2$. The temperature is then raised to 900° C. for 30 minutes. The resulting crystalline $U_3O_8$ fibers are greyish-black, 3–4 microns in diameter, and weigh 13.2 grams.

EXAMPLE 2

$UO_3$-$Al_2O_3$ fibers

Forty-five grams of 1.5 denier regular viscose fibers were imbibed with a mixture of uranyl chloride and aluminum chloride by immersion of the preswollen fibers in a single aqueous solution 0.4 molar in uranyl chloride and 2.8 molar in aluminum chloride for a period of 48 hours. After centrifugation to remove excess solution and drying the fibers in a stream of warm air, the loaded rayon fibers were converted to the oxide form by heating in air at a rate of 50° C./hr. to 400° C., and were freed of carbon by maintaining them in air at 400° C. for 4 hours. The product metal oxide fibers were composed of 56.5% by weight $UO_3$ and 43.5% by weight $Al_2O_3$. The amber colored mixed oxide fibers had a high degree of luster and had tensile strengths probably on the order of 150,000 p.s.i. The mixed oxide fibers had no crystal structure, as shown by X-ray diffraction.

EXAMPLE 3

$UO_2$-$Al_2O_3$ fibers 29.8 grams of 0.4 denier Tyrex rayon fibers (500 ft. length of yarn containing 4000 filaments) were immersed in 500 ml. of 2.0 molar $AlCl_3$ and 0.16 molar $UO_2Cl_2$ solution for 17 hours. After blotting thoroughly and centrifugation, the imbibed fibers were dried in a stream of warm air and found to contain 18.6 grams of $AlCl_3$ and $UO_2Cl_2$. The fibers were converted to the oxide form by heating in air at a rate of 20° C./hr. to 400° C., and kept at this temperature for 16 hours. The fibers were then heated in a stream of hydrogen in the tube furnace at 800° for 2 hours to reduce the $UO_3$ to $UO_2$. The product metal oxide fibers were composed of 46.0% by weight $UO_2$ and 54.0% by weight $Al_2O_3$, light brown in color and had diameters of 2.5–3.0 microns. The fibers were predominantly amorphous but contained poorly crystallized $UO_2$.

EXAMPLE 4

$UO_2$-$ZrO_2$ fibers

An aqueous solution was prepared containing 2.0 molar $ZrOCl_2$ and 0.20 molar $UO_2(NO_3)_2$. The uranium in the solution contained 38.8 weight percent U-235 isotope and the remainder U-238, made by dissolving 4 grams $UO_2(NO_3)_2 \cdot 6H_2O$ (93.15% U-235 enrichment) and 6 grams $UO_2(NO_3)_2 \cdot 6H_2O$ (naturally occurring 0.7% U-235) in 100 ml. of 2.0 molar $ZrOCl_2$. 20.6 grams of 0.4 denier Tyrex rayon fibers were immersed in this solution for 2 hours, blotted, centrifuged and dried in warm air. The fibers were then heated in air at a rate of 10° C./hr. to 370° C. and held at this temperature for 8 hours, then further heated to 400° C. for 24 hours. Next the fibers were placed in a tube-type furnace and heated in $H_2$ atmosphere at 1100° C. for 2 hours. The mixed metal oxide fiber product weighed 4.5 grams, contained 26.2 wt. percent $UO_2$, and had a fiber diameter of 2.6±0.3 microns. The fibers had a near circular cross-section, dark olive color, density of 6.1 gms./cc., and a tensile strength of probably about 100,000 p.s.i. From X-ray diffraction pattern observations at room temperature, the fibers had a single crystalline phase of tetragonal $ZrO_2$ stabilized by the $UO_2$ in solution.

EXAMPLE 5

$ThO_2$ fibers

A knitted rayon sock imbibed with a thorium compound, an article of commerce for use as an incandescent mantle in a Coleman gas lantern, was converted to the oxide by heating in air to 400° C. in an oxygen stream for an additional 24 hours. After this treatment the rayon was completely decomposed and the carbon volatilized from the knitted sock. The resulting sock was composed of white, lustrous thoria fibers of an amorphous structure. The sock was extremely flexible, similar to the starting rayon knitted sock. When viewed under the microscope at a magnification of 50, the thoria fibers appeared transparent to light (similar to window glass).

A second, and identical, knitted rayon sock imbibed with a thorium compound was burned off to the oxide form rapidly with a gas flame as is normally done for use as an incandescent gas mantle. The resulting thoria sock contained white fibers with a dull luster. The fibers also were very brittle and had little strength. X-ray diffraction pattern showed the thoria to be fairly well crystallized. The brittleness and low strength of thoria fibers made by burning off the rayon is attributed to crystallization and a large number of voids remaining in the fiber structure. In contrast, useful properties, such as high stength and flexibility, are developed by slow conversion to the amorphous metal oxide form at a low temperature.

EXAMPLE 6

$UO_2$ fibers 23.1 grams of 1.5 denier regular viscose fibers were preswelled by immersion in water for one hour, blotted thoroughly and contained about 0.89 gram $H_2O$ per gram rayon. They were then immersed in an n-butyl acetate solution containing 1.02 moles $UO_2$-$(NO_3)_2$ per liter, for a period of one hour. After blotting thoroughly and drying the fibers in a stream of warm air, 27.0 grams $UO_2(NO_3)_2$ had been imbibed in the fibers. They were placed in a tube-type furnace which was evacuated and then heated to 900° C. at a rate of 50° C./hr. The carbonized fibers were then oxidized at 500° C. over a period of several hours in atmospheres of increasing oxygen concentration from 4% $O_2$ (6% $N_2$) to 100% $O_2$. This step included removal of the final traces of carbon at 100% $O_2$ over a one hour period. The furnace was flushed of oxygen, and hydrogen gas was introduced at a rate of 1 liter/min. at 500° C. for several hours. The furnace temperature was finally raised to 1000° C. the resulting crystalline black-to-brown colored $UO_2$ fibers weighed 11.9 grams, were about 7–8 microns in diameter, and probably had tensile strength on the order of 150,000 p.s.i.

It has been previously indicated that fissionable material-containing glass fiber fuels experience considerable radiation damage on exposure to only moderate levels of neutron flux. I have discovered that the aforedescribed metal oxide fibers have far superior resistance to radiation damage, and furthermore, that elemental metal-metal oxide fibers have an amazing damage resistance to extremely high radiation levels. In general, the last-mentioned fibers comprising a first elemental metal and a second metal oxide are prepared by dissolving compounds of both metals in a solvent and following the same sequence of steps for preparing the metal oxide fibers. However, the fiber relic from the first heating-oxidation step is further heated at temperature of at least 300° C. and in the presence of a reducing gas. This latter step is thoroughly described in my aforementioned parent application Ser. No. 451,326 filed Apr. 27, 1965 and incorporated herein to the extent pertinent.

Briefly, each of the metals which can be prepared in the elemental form (Groups I–B, VI–B, and VIII of the Periodic Table, technetium, rhenium and zinc) has a free energy of formation in the oxide form of less than about 73 kilocalories per gram atom of oxygen in the oxide at 350° C. Also, the fiber relics from the first heating-oxidation step contain this first metal usually at least partially in the oxide form. An exception is nickel which is present in the form of $NiCl_2$.

Because of their relatively low free energies of formation, they may be readily reduced to the elemental form at temperatures between about 300° C. and 1400° C. The following Table I lists suitable temperatures for reducing the oxides of the various metals to the elemental form in a hydrogen atmosphere.

TABLE I

| Temperature, ° C.: | Metal |
|---|---|
| 300–400 | Cu |
| | Ag |
| | Au |
| | Ru |
| | Rh |
| | Pd |
| | Os |
| | Ir |
| | Pt |
| 400–500 | Ni |
| | Co |
| | Fe |
| | Tc |
| | Re |
| 500–700 | Mo |
| | W |
| | Fe |
| 1200–1400 | Cr |

It should also be recognized that the oxide of chromium is quite difficult to reduce to the elemental form, but may be reduced under less severe conditions when alloyed with other metals. For example, chromium oxide ($Cr_2O_3$) requires a temperature of 1200–1400° C. for reduction with hydrogen by itself, but when heated in hydrogen with iron oxide or nickel oxide the reduction may be achieved at about 900° C. Also, it may be desirable to prepare fibers containing multiple elemental metals, e.g. nickel and chromium, by coimbibement, for improved corrosion resistance.

There is no actual upper temperature limit on the second heating-reduction step, but as indicated in Table I, all of the elemental metal fibers may be prepared by reduction in hydrogen atomspheres at temperatures below about 1400° C.

Hydrogen gas is the preferred reducing atmosphere although other well-known reducing agents such as carbon monoxide and ammonia may be employed. With carbon monoxide, the reducing temperature should be at least 600° C., and when using ammonia a temperature of at least 800° C. is most suitable.

The duration of the second heating-reduction step depends on the metal compound to be reduced, the temperature and the reducing agent. In general, this step is completed in 2–6 hours at the temperature level indicated in Table I. The reduction step is preferably monitored by condensation of water from the exit gas.

It should be recognized that the first elemental metal portion of the fiber is highly crystalline, whereas the second metal oxide portion of the fiber is predominantly amorphous.

The following Examples 7–9 illustrate the preparation of first elemental metal-second metal oxide fibers according to the invention.

EXAMPLE 7

Elemental Ni-$UO_2$ fibers

This example illustrates the preparation of a metal fiber containing uranium, useful for fissiochemical fuels. The imbibing solution used was 2.0 molar nickel chloride and 0.1 molar uranyl nitrate, $UO_2(NO_3)_2$. The uranium was 23.4% enriched with U-235 isotope. The rayon used was 0.4 denier yarn; 100.9 grams of rayon were immersed for 24 hours in the solution, then centrifuged and dried at 100° F. The impregnated rayon contained 0.39 gram mixed salt per gram rayon.

In order to obtain an extremely low bulk density compact of fibers for use in fissiochemical reactions, the yarn containing 4000 filaments was cut into 2 inch lengths and using a wool card was fluffed into a loose wool mat. The mat was then heated in air at 10° C./hour to 350° C. and kept at this temperature for 13 hours. It was then further heated to 400° C. and held there for 1 hour to eliminate remaining traces of carbon. The oxidized fibers were then reduced in a hydrogen stream by heating at 400° C. for ½ hour, then raising the temperature to 800° C. and maintaining this temperature level for 1 hour The reduced elemental nickel fibers contained 23.8 wt. percent U as $UO_2$, had a uniform lustrous metallic color and were springy and strong. When heated further in hydrogen to 1000° C. the fibers lost their luster and small crystallites of $UO_2$ appeared on the surface of the nickel metal fibers. These crystallites were 0.1–0.2 micron in size. The bulk density of these fiber packs is about 2 lbs./ft.$^3$, or .03 gram/cc. and contains 99.7% void space. The fiber diameter was 1.8 microns.

EXAMPLE 8

Elemental Ni-$ThO_2$ fibers

The rayon used in this example was 9.0 denier textile tow. A sheet comprising 520 grams of rayon was immersed in 3 liters of 3.0 molar nickel chloride containing 32 grams of thorium nitrate per liter; the pH of the solution was 0.7. After immersion for 24 hours the impregnated rayon was blotted of excess solution and dried in warm air. The salt loading was 0.91 gram/gram of rayon. The impregnated rayon was heated in air to 600° C. The resulting oxide fibers were then reduced in hydrogen at 500° C. for 30 minutes in a stream of dry hydrogen of 4 liters/min. (STP). Chemical analysis of the fibers indicated the following composition: 90.97 wt. percent nickel, 8.40 wt. percent $ThO_2$ and 0.05 wt.

percent carbon. X-ray powder diffraction analysis showed highly crystalline nickel metal and poorly crystalline $ThO_2$, the broad diffraction lines for the $ThO_2$ indicating very small particles of thoria.

EXAMPLE 9
Elemental W-UO₂ fibers

A section of interlocked rayon felt made from 5.0 denier rayon filaments weighting 5.8 grams and measuring 3 inches by 6 inches and approximately ¼ inch thick was immersed in 100 ml. of a solution containing 840 grams of tungsten per liter, the specific gravity being 1.99 and pH 3.9. The tungsten solution had been prepared by dissolving ammonium paratungstate in a 30% by weight hydrogen peroxide solution. To this 100 ml. solution was added 4.03 grams $UO_2(NO_3)_2 \cdot 6H_2O$ (natural enrichment). After 90 minutes immersion the felt was centrifuged, dried in a stream of warm air, and contained 5.5 grams of the tungsten and uranium salts.

The imbibed felt was heated in air at a rate of 20° C./hr. to 300° C., maintained at this temperature for 4 hours, then heated further at 50° C./hr. to 350° C. and held at this level for 4 hours. The black pyrolyzed felt was placed in a tube-type furnace and heated in a 4 liter/min. hydrogen stream according to the following schedule: 550° C.—½ hr., 600° C.—4 hrs., 700° C.—1 hr. and 1100° C.—1 hr. The product felt had a grey metallic color, weighed 4.2 grams and measured 1.3 inches by 2.6 inches by ⅛ inch thick. The tungsten felt contained 5 wt. percent $UO_2$, had a fiber diameter of 7-8 microns, and a highly crystalline tungsten phase. The $UO_2$ phase was found to be dispersed as 100-1000 Angstroms in size throughout the tungsten matrix. When pulled in a direction parallel to the long dimension, the metal oxide felt had a breaking strength of 2.3 lbs.

Fibers containing fissionable material and carbon are also useful as a fibrous fuel for conducting a fissiochemical reaction according to this invention. These fibers may be prepared in a manner similar to the previously described metal oxide fibers, except that the carbon relic from the organic fiber is not evolved as carbon-oxides gas.

EXAMPLE 10
Carbon-UO₂ fibers

After preswelling 1.75 grams of 9.0 denier regular viscose rayon fibers by immersing in water for one hour, and blotting, they were reimmersed in 100 ml. of n-butyl acetate containing 1.02 moles/liter $UO_2(NO_3)_2$ (about 0.7% natural enrichment of U-235) for one hour. The fibers were next blotted, centrifuged and the solvent evaporated in a stream of warm air. They were then placed in a tube-type furnace, evacuated and heated at a rate of 10° C./hr. to 900° C. and held at this temperature for one hour. A vacuum of less than one micron Hg was maintained over the fibers during the heating cycle. The product carbon fibers were black, lustrous and flexible. The carbonized fibers weighed 1.40 grams and contained 57.5 wt. percent $UO_2$. Fiber diameters were about 15 microns. Individual fibers supported 16.1 to 32.8 grams of weight before breaking, using a modified analytical balance, which indicated tensile strengths between 140,000 and 290,000 p.s.i.

Two 2-inch lengths of these uranium-containing fibers were sealed in a quartz tube with an atmosphere of helium gas, and placed in a pool-type nuclear reactor. In a thermal neutron flux region of $4.0 \times 10^{13}$ neutrons/sq. cm./sec. for a period of 100 hours, the uranium in the fibers had undergone $6.0 \times 10^{16}$ fissions per gram fibers during this exposure time. The fibers underwent no damage by this radiation treatment. The general appearance and resiliency of the fibers were unchanged. Tensile strength measurements on six of the fibers revealed that their strength was undiminished by the radiation treatment.

A series of experiments were conducted to compare the relative effects of radiation exposure on various fibrous fissiochemical fuels. The first fiber pack was $Al_2O_3 + UO_3$ containing 38.3 wt. percent U as 93% enriched U-235, and had a specific gravity of about 3.6 grams/cc. (by the xylol pycnometer method). The fibers had been prepared according to the Example 2 procedure, were amorphous, and heated at 375° C. for 24 hours for greater dimensional stability. The second fiber pack was $Al_2O_3 + UO_2$, and identical to fiber pack No. 1 except that they were reduced in a hydrogen atmosphere at 600° C. for 1 hour, in a manner very similar to Example 3. The third fiber pack was $ZrO_2 + UO_2$, and the same fibers prepared as described in Example 4. That is, they were reduced in a hydrogen gas atmosphere at 600° C. for 1 hour and contained 26 wt. percent U as 93% enriched U-235. The fourth fiber pack was $ZrO_2 + UO_3$ identical to the third pack but not reduced. The fibers were in the amorphous state and characterized by an orange color. The fifth fiber pack was $Ni-UO_2$ prepared in the same manner as described in Example 7, contained 30.75% fully enriched U-235 and were 1.5–2.5 microns in diameter. The sixth fiber pack was composed of glass fibers of 3–8 microns diameter containing 27.4 wt. percent U of which 93% was enriched U-235.

In these comparative experiments, small quantities (0.2–0.3 mg.) of the six types of fiber packs were degassed at 300° C. and sealed in 4-mm. quartz tubes under 0.5 atm. pressures of helium, hydrogen or oxygen. The packs were then exposed to various degrees of neutron flux, and a qualitative estimate of radiation damage was made. These experiments are summarized in Table II.

TABLE II.—EFFECT OF RADIATION ON FIBROUS FUELS

| Fiber | | | Reactor Exposure | | | | |
|---|---|---|---|---|---|---|---|
| Type | Weight, Mg. | Gas Atmosphere | Thermal $\phi$, $nv$ ($\times 10^{13}$) | Integrated $\phi$, $nvt$ ($\times 10^{18}$) | Fissions/ gm. of fiber ($\times 10^{18}$) | Percent U-235 Burnup | Results, Visual Observations at 25× |
| (1) $Al_2O_3 + UO_3$ | 0.24 | Helium | 0.2 | 0.0006 | 0.0003 | $3 \times 10^{-5}$ | No change-original gold-yellow color. |
| | 0.3 | ---do--- | 0.2 | 0.0036 | 0.002 | $2 \times 10^{-4}$ | Do. |
| | 0.20 | ---do--- | 5.8 | 0.20 | 0.11 | 0.01 | Same color-slight curling of fibers. |
| | 0.20 | ---do--- | 1.0 | 0.36 | 0.20 | 0.02 | Smoky color-fibers curled about ½ bulk volume. |
| | 0.18 | ---do--- | 1.0 | 3.6 | 2.0 | 0.20 | Black fibers-sintered into small volume. |
| | 0.19 | ---do--- | 9.0 | 32.0 | 18.0 | 1.8 | No evidence of fibers remain— sintered into small black ball. |
| | 0.23 | Oxygen | 9.0 | 32.0 | 18.0 | 1.8 | Do. |
| (2) $Al_2O_3 + UO_3$ | 0.2 | Hydrogen | 9.0 | 32.0 | 18.0 | 1.8 | Do. |
| (3) $ZrO_2 + UO_2$ | 0.31 | Helium | 5.8 | 0.20 | 0.07 | 0.01 | Fibers remain dark—some curling of fibers. |
| | 0.28 | ---do--- | 1.0 | 0.36 | 0.13 | 0.02 | Do. |
| | 0.23 | ---do--- | 1.0 | 3.6 | 1.3 | 0.20 | Fibers still detectable although sintered into small volume. |
| | 0.23 | ---do--- | 9.0 | 32.0 | 11.0 | 1.8 | No evidence of fibers remain—sintered into small black ball. |
| (4) $ZrO_2 + UO_3$ | 0.26 | Hydrogen | 9.0 | 32.0 | 11.0 | 1.8 | Do. |
| | 0.27 | Oxygen | 9.0 | 32.0 | 11.0 | 1.8 | Do. |
| (5) $NiUO_2$ | 0.3 | Helium | 1.0 | 3.6 | 13.1 | 0.2 | No visible change. |
| | 0.3 | ---do--- | 9.0 | 32.0 | 13.0 | 1.8 | Do. |
| (6) Glass $UO_2$ | 0.23 | ---do--- | 9.0 | 32.0 | 13.0 | 1.8 | No evidence of fibers-dark mass adhering to quartz wall appears to have melted. |
| | 0.27 | Oxygen | 9.0 | 32.0 | 13.0 | 1.8 | Do. |
| | 0.20 | Hydrogen | 9.0 | 32.0 | 13.0 | 1.8 | Do. |

Inspection of Table II reveals that neither the alumina fibers, containing 3.8 wt. percent U-235, nor the zirconia fibers, containing 24 wt. percent U-235, experienced appreciable change until exposed to fission levels of $0.1$–$0.2 \times 10^{18}$ fission/gm. or 0.01–0.02% burn-up of U-235. At this level, curling and apparent sintering of the fibers began. Further curling occurred at higher exposures and, at 0.2% burn-up, the loose fiber bundles (1000–2000 fibers, 0.3 cm. long) were reduced to a volume about one-quarter that of the original. At approximately 2% burn-up (100 hrs. in $9 \times 10^{13}$ thermal neutron flux or $3.2 \times 10^{19}$ nvt), the fibers formed a rigid sintered spherical mass. There appeared to be little effect of the type of gas atmosphere on the rate of fission damage. The golden yellow $Al_2O_3$-$UO_3$ fibers turned smoky and finally to black fibers as the exposure was increased. Orange $ZrO_2$-$UO_3$ fibers became smoky and changed finally to black fibers having a yellow tinge. It appeared that the fission caused $UO_2$ to decompose to $UO_2$ since the final colors were the same as fibers reduced at 1000° C. Darkening of the fibers occurred even in capsules containing oxygen gas. The nickel-$UO_2$ fibers were irradiated for 100 hours at thermal neutron fluxes of $1.0 \times 10^{13}$ and $9.0 \times 10^{13}$ nv, resulting in 0.2 and 1.8% burn-up, respectively. These exposures caused no visible changes in the structure of the fibers.

In marked contrast to the elemental metal-metal oxide fibers, the glass fiber pack melted under comparable radiation exposure into a dark mass tightly adhering to the walls of the quartz tube. It is thus apparent that the elemental nickel-metal oxide fibers are far superior to glass fibers in terms of resistance to radiation damage.

The eutectic points of the $Al_2O_3$-$UO_2$ and $ZrO_2$-$UO_2$ systems are at 1900° C. and 2550° C., respectively. The alumina and zirconia fibers showed no indication of fusion to the quartz walls in any of the capsules. However, the tight adherence of an elongated mass of dark glass to the quartz tube walls indicated that the glass fibers may have melted down without appreciable curling or sintering. The observed damage to the alumina and zirconia fibers is attributed to the accumulation of localized sintering or melting of the oxides by high temperatures in the regions of individual fission events.

Significant improvements in the dimensional stability of the solid solution $ZrO_2$-$UO_2$ fibers to neutron exposure can be achieved by heat treatment to increase fiber density and crystallinity. In a second series of irradiations, zirconia fibers, which had been heat treated at 1000° C. and above were found to be much less susceptible to curling and sintering during neutron exposure resulting in 0.2% burn-up at low irradiation temperatures. The fibers tested were 2–3 microns in diameter and contained 24.2 wt. percent U as fully enriched $UO_2$.

Heat treatment of $Al_2O_3$-UO fibers to form the alpha-alumina crystalline phase does not increase the dimensional stability of the fibers during neutron exposure. At 0.2% burn-up at low temperatures, the crystalline fibers become curled and sinter together similar to amorphous fibers. The relative radiation stability of $ZrO_2$-$UO_2$ and $Al_2O_3$-$UO_2$ systems in fibrous forms is consistent with the relative stability of these oxides in bulk sintered forms.

Although it is difficult to determine accurately the temperature increase in the fibers caused by fission and gamma heating in the very small volume occupied by the fibers (approximately 0.01 cm.$^3$), approximate calculations indicate that the fibers in the center of the bundles when exposed to $9 \times 10^{13}$ thermal flux did not exceed 300–400° C. At this flux level, assuming total fission energy deposition in the fibers, the fiber surface heat flux is approximately 1–2 watts/cm.$^2$ and the power density of the bulk fibers is about 30–60 kw./liter.

The instant process for conducting a fissiochemical reaction was demonstrated by irradiation of a gas reactant with fission fragments from uranium oxide-containing fiber fuel in a once-through, in-reactor loop. This apparatus permitted measurement of the yields and product distribution at high temperature, pressure and dose rate.

The loop consisted of the reactant make-up system, two small capsules containing the fissionable fuels, product analysis systems, radioactive off-gas delay beds, and the necessary interconnecting conduits. Since radioactive gases were carried in the product stream, heavy shielding, secondary containment and remote operation were required. The capsules were inserted through the shield of a 5 mw. swimming pool-type reactor by curved pipes imbedded in the beam tube plug. Gas inlet and exit lines were electrically heated to minimize product condensation. The capsules were heated by absorption of the radiation from the reactor and were cooled by an external gas flow. One capsule contained a simple geometry fuel, such as uranium dioxide plated on stainless steel foil. The other capsule contained one of the fibrous fissiochemical fuels. By comparing data generated by two capsules in this arrangement, the effectiveness of the fibrous fuel was determined relative to the standard foil fuel element. Analysis of the product stream was primarily by vapor phase chromatography.

The beam tube insert was a stepped plug of aluminum fitted into the liner which penetrates the reactor pool wall. The insert was approximately 60-in. long and filled with high density concrete. Embedded within the concrete were two 1½ in. aluminum tubes containing the gas lines and capsules. These tubes extended an additional 27-in. so that the fuel capsules were almost flush with the reactor core. Coiling of the tubes, one turn in 60-in. minimizes radiation streaming. External concentric lines carry water for the gross cooling of the beam tube insert and gas for capsule temperature control.

Each capsule was a stainless steel cylinder, 2½ in. long and 1 in. diameter with stainless plugs in each end. The gas mixture was admitted at the core end from a tube running the length of the capsule. Before leaving the capsule the gas passed through a 150 mesh screen and then into the exit line. Several thermocouples were located at various positions within the capsule.

Flux mapping of the capsule locations was performed by irradiating five Al-0.1% Au wires inside a dummy capsule in each of the capsule positions. Four of the wires were located around the periphery of the capsule and one was mounted as close to the center line as possible.

Before discharging the process effluent to vent, each stream was passed through its own delay or hold-up bed. Each bed was about 65 feet long and consisted of a series of ¾″ OD hard drawn copper tubes packed with 4–6 mesh activated carbon. The beds were designed to provide at least a one hour hold-up of the zenon and krypton generated in the fission process before being passed to vent.

In addition to the delay beds for each loop, a third bed, designated as the "startup" bed, was also provided to store activity generated in a capsule between experiments.

In one series of runs in this loop, nitrogen-methane gas mixtures were introduced into the two capsules. Products of the reaction include hydrogen, ammonia, hydrocyanic acid (HCN), acetonitrile ($CH_3CN$), cyanogon ($C_2N_2$), and light hydrocarbons such as ethane ($C_2H_6$) and ethylene ($C_2H_4$). A gas chromatographic technique for detecting these products was used. These runs are summarized in Tables III, IV and V. In the Table III runs, the experimental capsule was fuel with 20 stainless steel discs, each with a vapor deposited $UO_2$ coating on one side. The discs were positioned four deep in a pentagonal aluminum holder and three thermocouples were located in the gas volume. The $UO_2$ coating ranged from 1.72 to 3.12 microns thick and an average of 31% of the fission recoil energy escapes from the discs. The discs were arranged in the capsule such that all of the escaping energy, 3.3 watts, was deposited in the gas phase.

In Tables III, IV and V, the term "G(HCN)" is used.

The G-value refers to the number of molecules of product (HCN) formed per 100 electron volts total fission recoil kinetic energy deposited in the reactant system by the fissioning material. It should be appreciated that only a fraction of this energy is actually absorbed by the reactant system, depending to a considerable extent on the form of the fuel. For example, about 84% of the 200 million electron volts resulting from the fissioning of a uranium atom will appear as fission recoil energy, or 168 million electron volts. As previously indicated, about one-half of this energy is lost in the supporting substrate of plated fuel elements of the Table III type. On the other hand, fibrous fuel permit escape of a considerably higher percentage of the recoil energy, and this fraction increases with decreasing fiber diameter. This is demonstrated by the following values for $ZrO_2$-$UO_2$ fibers containing 23% U-235, and prepared from 0.4 denier rayon as described in Example 4.

| Fiber diameter (microns) | Recoil energy escape percentage |
|---|---|
| 1.8 | 83.5 |
| 2.0 | 80.7 |
| 2.2 | 80.0 |
| 2.6 | 78.8 |

A preferred range of fiber diameters is between about 1 and 3 microns. Smaller diameters provide higher recoil energy escape percentages but are very susceptible to compaction and thus loss of the desired fiber bundle geometry for maximum efficiency. Diameters above 3 microns do not significantly improve the compaction factor and are characterized by lower fission recoil energy escape factors.

TABLE III.—HCN YIELDS

[Fuel: $UO_2$ coating on stainless steel discs]

| Feed Flow, scc./min.[1] | Percent $CH_4$ | Av. temp., TC 3-5° C. | Pressure, p.s.i.g. | G(HCH) | [HCN], percent |
|---|---|---|---|---|---|
| 345 | 5.8 | 348 | 200 | 1.0 | 0.11 |
| 290 | 10.3 | 349 | 200 | 0.99 | 0.13 |
| 295 | 13.6 | 352 | 300 | 0.7 | 0.09 |
| 295 | 11.9 | 352 | 300 | 0.6 | 0.07 |
| 290 | 10.3 | 352 | 300 | 0.5 | 0.07 |
| 290 | 9.2 | 352 | 300 | 0.5 | 0.07 |
| 290 | 8.6 | 352 | 300 | 0.6 | 0.08 |
| 290 | 8.2 | 350 | 300 | 0.5 | 0.06 |
| 290 | 6.9 | 350 | 300 | 0.5 | 0.06 |
| 290 | 5.2 | 350 | 300 | 0.4 | 0.05 |
| 300 | 21.8 | 350 | 300 | 0.32 | 0.04 |
| 995 | 18.1 | 173 | 205 | 0.8 | 0.03 |
| 580 | 18.4 | 176 | 205 | 0.49 | 0.03 |
| 395 | 19.0 | 173 | 205 | 0.36 | 0.04 |
| 385 | 11.7 | 178 | 205 | 0.52 | 0.05 |
| 375 | 12.0 | 354 | 204 | 1.2 | 0.12 |
| 800 | 10.8 | 324 | 200 | 0.88 | 0.04 |
| 620 | 10.8 | 332 | 200 | 1.03 | 0.07 |
| 420 | 10.8 | 338 | 200 | 0.96 | 0.09 |
| 210 | 10.8 | 342 | 200 | 1.09 | 0.20 |
| 810 | 10.8 | | 200 | 0.68 | 0.33 |
| 815 | 1.05 | 331 | 204 | 0.92 | 0.04 |
| 620 | 1.05 | 334 | 204 | 1.01 | 0.06 |
| 423 | 1.05 | 340 | 204 | 0.96 | 0.09 |
| 205 | 1.05 | 343 | 204 | 0.73 | 0.14 |
| 70 | 1.05 | 344 | 204 | 0.29 | 0.26 |

[1] The term "scc." means "standard cubic centimeters", i.e., cubic centimeters of gas at standard conditions.

TABLE IV.—HCN YIELDS

[Fuel: $ZrO_2$-$UO_2$ Fibers]

| Feed Flow, scc./min. | Percent $CH_4$ | Temp., ° C. TC 2 | TC 1 (wall) | Pressure, p.s.i.g. | G(HCN) | [HCN], percent | G(HCN) at assumed internal temperature 400° | 600° | 800° |
|---|---|---|---|---|---|---|---|---|---|
| 355* (24 hr.) | 22.6 | 500 | 160 | 205 | 2.0 | 0.31 | 1.8 | 2.1 | 2.4 |
| 355* (46 hr.) | 18.3 | 490 | 154 | 200 | 1.6 | 0.25 | 1.5 | 1.7 | 2.0 |
| 360 | 17.8 | 575 | 352 | 200 | 1.5 | 0.21 | 1.3 | 1.5 | 1.8 |
| 805 | 26.8 | 430 | 144 | 395 | 0.70 | 0.08 | 0.68 | 0.78 | 0.88 |
| 560 | 26.8 | 430 | 148 | 395 | 0.61 | 0.09 | 0.60 | 0.68 | 0.76 |
| 450 | 31.1 | 430 | 155 | 395 | 0.41 | 0.08 | 0.40 | 0.46 | 0.52 |
| 435 | 15.3 | 445 | 151 | 395 | 0.71 | 0.14 | 0.69 | 0.79 | 0.89 |
| 530 | 13.2 | 530 | 154 | 300 | 0.7 | 0.009 | 0.65 | 0.75 | 0.86 |
| 385 | 20.8 | 560 | 158 | 200 | 0.47 | 0.06 | 0.40 | 0.48 | 0.56 |
| 330* (94 hr.) | 21.2 | 575 | 158 | 200 | 0.37 | 0.06 | 0.32 | 0.38 | 0.44 |
| 320 | 14.1 | 585 | 158 | 200 | 0.4 | 0.07 | 0.36 | 0.43 | 0.5 |
| 760 | 17.2 | 485 | 147 | 200 | 0.48 | 0.04 | 0.44 | 0.53 | 0.61 |
| 500 | 21.5 | 495 | 146 | 200 | 0.40 | 0.05 | 0.37 | 0.44 | 0.51 |
| 495 | 14.2 | 495 | 146 | 200 | 0.5 | 0.06 | 0.5 | 0.6 | 0.7 |
| 975 | 16.9 | 505 | 148 | 200 | 0.5 | 0.03 | 0.5 | 0.6 | 0.7 |
| 815 | 17.2 | 510 | 148 | 200 | 1.1 | 0.08 | 1.0 | 1.2 | 1.4 |
| 590 | 17.8 | 510 | 144 | 200 | 0.5 | 0.04 | 0.4 | 0.5 | 0.5 |
| 400 | 18.7 | 520 | 143 | 200 | 0.44 | 0.06 | 0.00 | 0.47 | 0.55 |
| 390 | 12.8 | 520 | 143 | 200 | 0.5 | 0.06 | 0.4 | 0.5 | 0.6 |
| 390 | 11.5 | 525 | 143 | 200 | 0.58 | 0.09 | 0.52 | 0.62 | 0.72 |
| 325 | 5.4 | 695 | 351 | 200 | 0.35 | 0.05 | 0.27 | 0.33 | .40 |
| 345 | 10 | 690 | 352 | 200 | 0.4 | 0.06 | 0.3 | 0.4 | 0.4 |
| 335 | 23.5 | 655 | 353 | 200 | 0.25 | 0.04 | 0.20 | 0.24 | 0.28 |
| 360 | 41.9 | 625 | 352 | 200 | 0.14 | 0.02 | 0.12 | 0.14 | 0.16 |
| 265 | 28.3 | 610 | 352 | 200 | 0.1 | 0.02 | 0.1 | 0.1 | 0.1 |
| 420 | 71.4 | 600 | 352 | 200 | 0.06 | 0.01 | 0.05 | 0.06 | 0.07 |

*Compare these data foraging effect. Time is total irradiation hours for capsule.

TABLE V.—HCN YIELDS

[Fuel: $ZrO_2$-$UO_3$ Fibers]

| Feed Flow, scc./min. | Percent $CH_4$ | Temp., ° C. TC 6 and 7 | Wall | Pressure, p.s.i.g. | G(HCN), TC 6 and 7 | [HCN], percent | G(HCN) at assumed internal temperature 400° | 600° | 800 |
|---|---|---|---|---|---|---|---|---|---|
| 160* (2-3 hr.) | 1.05 | 413 | 336 | 200 | 0.90 | 0.30 | 0.89 | 1.05 | 1.21 |
| 124 | 1.05 | 266 | 169 | 203 | 0.3 | 0.16 | 0.4 | 0.4 | 0.5 |
| 155* (~18 hr.) | 1.05 | 411 | 345 | 203 | 0.82 | 0.28 | 0.81 | 0.96 | 1.11 |
| 130 | 1.05 | 393 | 330 | 200 | 0.5 | 0.22 | 0.5 | 0.6 | 0.7 |
| 148* (~45 hr.) | 1.05 | 393 | 330 | 200 | 0.69 | 0.25 | 0.69 | 0.82 | 0.94 |
| 105 | 1.05 | 380 | 330 | 200 | 0.18 | 0.10 | 0.19 | 0.22 | 0.25 |
| 95 | 1.05 | 350 | 330 | 200 | 0.1 | 0.2 | 0.2 | 0.2 | 0.3 |
| 175 | 1.05 | ~360 | 330 | 200 | 0.4 | 0.12 | 0.4 | 0.5 | 0.5 |
| 160* (120 hr.) | 1.05 | 380 | 330 | 200 | 0.46 | 0.17 | 0.47 | 0.56 | 0.64 |
| 240 | 1.05 | | 334 | 198 | | 0.1 | 0.5 | 0.6 | 0.7 |
| 220 | 1.05 | | 334 | 198 | | 0.1 | 0.6 | 0.7 | 0.8 |
| 205 | 1.05 | | 334 | 198 | | 0.15 | 0.6 | 0.7 | 0.8 |
| 165* (170 hr.) | 1.05 | | 334 | 198 | | 0.1 | 0.4 | 0.5 | 0.6 |
| 210 | 10.8 | | 338 | 204 | | 0.1 | 0.4 | 0.4 | 0.5 |
| 178 | 10.8 | 370 | 340 | 204 | 0.3 | 0.11 | 0.34 | 0.41 | 0.46 |
| 170 | 10.8 | 370 | | 204 | 0.3 | 0.1 | 0.3 | 0.4 | 0.5 |
| 159* (190 hr.) | 10.8 | | 341 | 204 | | 0.11 | 0.31 | 0.37 | 0.42 |
| 53 | 10.8 | | 342 | 204 | | 0.16 | 0.14 | 0.17 | 0.19 |
| 135* (~550 hr.) | 1.05 | 340 | 320 | 200 | ~0.02 | | | | |

*Compare these data for aging effect. Time is total irradiation hours for capsule.

The Table IV fuel was $ZrO_2$-$UO_2$ fibers prepared according to the procedure of Example 4 and having the following characteristics.

TABLE VI

| | |
|---|---|
| Wt. of $ZrO_2$-$UO_2$ fibers | 0.803 gm. |
| U-content | 23 wt. percent. |
| U-235 enrichment | 38.8%. |
| U-235 in capsule | 0.072 gm. |
| Fiber heat treatment | $H_2$, 1100° C., 2 hr. |
| Fiber diameter | 2.6±0.3 microns. |
| Fiber density (xylene pycometer) | 6.1 gm./cm.³ |
| Fiber bulk density in capsule | 0.032 gm./cm.³ or 2.0 lb./ft.³ |

Fission power [1] (A-position):

| | Watts |
|---|---|
| In 1st 0.5-inch section ($\phi=6.7\times10^{12}$) | 4.9 |
| In 2nd 0.5-inch section ($\phi=5.9\times10^{12}$) | 4.4 |
| In 3rd 0.5-inch section ($\phi=5.1\times10^{12}$) | 3.8 |
| In 4th 0.5-inch section ($\phi=4.4\times10^{12}$) | 3.2 |
| | 16.3 |

[1] Thermon neutron fluxes determined by gold wire monitors. A fission cross section for U-235 of 504 barns was used.

The Table V fuel was 0.701 gm. of $ZrO_2$-$UO_2$ fibers from the same batch as those used in the Table IV runs.

It will be apparent from Tables III, IV and V that HCN was the principal observed product of the $CH_4$-$N_2$ fissiochemical reaction. It was identified by retention time on several vapor phase chromatography columns. $CH_3CN$ was identified as a minor product, also by retention time in vapor phase chromatography. It was noted in the Table IV runs that raising the capsule wall temperature from 150° to 350° C. increased the $CH_3CN$ yield from about 5% to about 20% that of the HCN, while G(HCN) varied only slightly.

The methane fuel gas contained a detectable amount of ethane, and comparison of reactant and product gas streams indicated a doubling or tripling of ethane content after passage through the loop. It is possible that energy transfer to methane may have caused this increase in ethane content. Additional minor products; presumably hydrocarbons, were observed when $CH_4$ to $N_2$ ratios greater than 0.5 were used in the Table IV runs.

Black, carbonaceous, nitrogen-containing material was found in disassembled capsules and their exit lines. Kiejdahl analysis was used for nitrogen identification. Approximately two to ten times as much methane was consumed as HCN was produced. It is possible that part of the methane consumed produces hydrocarbon polymers and eventually coke.

An inspection of Tables IV and V reveals that G(HCN) values of at least 2 were observed in the first runs with the fiber-containing capsules, however, the fuel became less efficient with age. That is, the runs were conducted in the same sequence as they appear in the tables, the final run being the data listed at the bottom of each table. The apparent cause for loss of efficiency with aging was shrinkage of the fiber fuel bundle. For comparison of results after the same periods of operation, data in Tables IV and V are marked with asterisks to note the aging effect.

The plate-type fuel of Table III attained a G(HCN) of at least 1, but did not appear to age significantly. Since temperature does affect G(HCN), the higher yields from fiber capsules may be due to the higher internal temperatures in these capsules. A control experiment eliminated the possibility that catalytic effects contributed to the yield in the Table IV and V runs using $ZrO_2$-$UO_2$ fiber fuels.

It was found that G(HCN) increases with increasing temperature using the Table V $ZrO_2$-$UO_2$ fibers, a feed gas mixture comprising 1.05% $CH_4$ and 98.95% $N_2$, flow of 125–155 scc./min. and 203 p.s.i.g. At 270° C. the G(HCN) was 0.3 whereas at 411° C. the G(HCN) was 0.8.

Tables IV and V demonstrate that G(HCN) varied with total gas flow through the capsule, and appeared to be greatest between 200 and 800 scc./min. at 200 p.s.i.g. From the Table V data it may be noted that G(HCN) decreases at flow rates below 100–200 scc./min. at 200 p.s.i.g. This effect is probably due to radiation-induced destruction of HCN, possibly by polymerization. The G value for $CH_4$ consumption also increases as the total flow increases.

Although the invention has been specifically described in terms of conducting the fissiochemical reaction of methane and nitrogen to hydrocyanic acid, it is equally suitable for performing other fissiochemical reactions using fibrous fuel containing fissionable forms of thorium, uranium and plutonium. For example, another form of nitrogen fixation is reaction with oxygen to form nitrogen dioxide at for example 200–400° C. and high pressures on the order to 1000 p.s.i. (G($NO_2$)) values of about 6–8 are attainable.

Another suitable reaction is the conversion of hydrogen fluoride in the liquid phase to elemental fluorine and hydrogen gas products at temperatures on the order of 100–200° C. and corresponding pressures of 200–1000 p.s.i. It should be noted that the hydrogen fluoride system is extremely corrosive and the previously mentioned glass fibers could not be used therein without decomposition. In contrast, certain of the present fibers as for example elemental Ni-$UO_2$ and elemental W-$UO_2$ are characterized by high corrosion resistance and are useful as the fuel for the reaction.

Another inorganic, liquid phase fissiochemical reaction which could be conducted using the present fiber fuels is the conversion of ammonia to hydrazine and hydrogen. G-values for hydrazine have been found to be 1–2 when liquid ammonia at about 100° F. and 200 p.s.i. is exposed to fission recoil kinetic energy. The G($H_2$) is on the order of 5.7. Of course, this reaction may also be conducted in the gas phase at for example 300° C. and atmospheric pressure. G-values for hydrazine of about 3 have been measured under these conditions.

A further fissiochemical reaction contemplated by the present invention is the conversion of liquid oxygen at for example −183° C. at pressures on the order of 500–1000 p.s.i.g. to ozone, with G($O_3$) of about 15.

A still further organic reaction which may be conducted in either liquid or gas phase is the conversion of methanol to ethylene glycol with G-values on the order of 3. For the liquid phase reaction the temperature would be about 120–220° C. and pressure of 100–1000 p.s.i. For the gas phase reaction the temperature is on the order of 220–400° C. at pressures of about 1000 p.s.i.

Although preferred embodiments of this invention have been described in detail, it is contemplated that modifications of the composition and process may be made and that some features may be employed without others, all without ing the scope of the invention.

What is claimed is:

1. A process for conducting a fissiochemical reaction comprising the steps of:
   (a) providing as a fissiochemical fuel, fibers containing an oxide of a member selected from the class consisting of fissionable forms of thorium, uranium and plutonium, said fibers consisting essentially of a total of at least 80 percent by weight of oxides of one or more of the metals beryllium, magnesium, calcium, strontium, barium, scandium, yttrium, lanthanum, cerium, and other rare earth elements titanium, zirconium, hafnium, vanadium, niobium, tantalum, chromium, molybdenum, tungsten, manganese, iron, cobalt, nickel, copper, zinc, cadmium, aluminum, gallium, tin, lead, thorium, uranium, and plutonium, and having diameters of 1–25 microns and tensile strength over 40,000 p.s.i.;

(b) subjecting said fissiochemical fuel to a neutron flux sufficient to fission the fuel and discharge fission fragment recoil kinetic energy therefrom; and (c) providing a chemical reactant fluid and contacting such fluid with a sufficient portion of said fission fragment recoil kinetic energy to change at least part of said chemical reactant into a different molecule;

(d) wherein said fibers are produced by a process which comprises:

(i) providing a metal compound of a first metal and a metal compound of a second metal both dissolved in a solvent, said first metal being selected from the group consisting of beryllium, magnesium, calcium, strontium, barium, scandium yttrium, lanthanum, cerium and other rare earth elements, titanium, zirconium, hafnium, vanadium, niobium, tantalum, chromium, molybdenum, tungsten, manganese, iron, cobalt, nickel, copper, zinc, cadmium, aluminum, gallium, tin, lead, thorium, uranium, and plutonium, and said second metal being selected from fissionable forms of thorium, uranium, and plutonium;

(ii) immersing an organic fiber in the first and second metal compounds-containing solvent thereby swelling and opening the fiber interstices such that the first and second metal compounds are imbibed in said interstices;

(iii) removing the unimbibed first and second metal compounds from the outer surface of said fiber and drying the first and second metal compounds-imbibed fibers; and (iv) heating the first and second metal compound-imbibed fiber; and (iv) heating the first and second metal compounds-imbibed fiber to a temperature between about 350° C. and 500° C. at a rate sufficiently low to avoid ignition of the fiber, for at least one hour and sufficient duration to decompose the organic structure of said fiber and evolve at least most of the carbonaceous matter therefrom to form a fiber relic and convert both of said metal compounds to metal oxide, at least part of said heating being performed in an oxygen-containing atmosphere.

2. A process according to claim 1 in which uranium oxide is the selected metal oxide.

3. A process according to claim 1 in which the fibers are composed of uranium oxide and zirconium oxide.

4. A process according to claim 1 in which the fibers have diameters of between about 1 and 3 microns.

5. A process according to claim 1 in which the fibers contain between about 5 and 40 weight percent of the fibers in the selected fissionable metal oxide.

6. A process for conducting a fissiochemical reaction comprising the steps of:

(a) providing as fissiochemical fuel, fibers containing a first elemental metal being selected from the class consisting of Group I–B, VI–B and VIII of the Periodic Table, technetium, rhenium and zinc, and an oxide of a second metal selected from fissionable forms of the group consisting of thorium, uranium and plutonium, said fibers having diameters of 1–25 microns and tensile strength over 40,000 p.s.i.;

(b) subjecting said fissiochemical fuel to a neutron flux sufficient to fission the fuel and discharge fission fragment recoil kinetic energy therefrom; and (c) providing a chemical reactant fluid and contacting such fluid with a sufficient portion of said fission frament recoil kinetic energy to change at least part of said chemical reactant into a different molecule;

(d) wherein said fibers are produced by a process which comprises:

(i) providing a metal compound of a first metal and a metal compound of a second metal both dissolved in a solvent, said first metal being selected from the group consisting of metallic elements of Groups I–B, VI–B and VIII of the Periodic Table, technetium, rhenium and zinc, and said second metal being selected from fissionable forms of the group consisting of thorium, uranium and plutonium;

(ii) immersing an organic fiber in the first and second metal compounds-containing solvent thereby swelling and opening the fiber interstices such that the first and second metal compounds are imbibed in said interstices;

(iii) removing the unimbibed first and second metal compounds from the outer surface of said fiber and drying the first and second metal compounds-imbibed fiber;

(iv) heating the first and second metal compounds-imbibed fiber to a temperature between about 350° C. and 500° C. at a rate sufficiently low to avoid ignition of the fiber, for at least one hour and sufficient duration to decompose the organic structure of said fiber and evolve at least most of the carbonaceous matter therefrom to form a fiber relic and convert at least the second metal compound to a metal oxide, at least part of said heating being performed in an oxygen-containing atmosphere; and (v) further heating the fiber relic from heating step (iv) at a temperature of at least 300° C. and in the presence of a reducing gas so as to reduce said first metal to the elemental form while retaining said second metal in an oxide form.

7. A process according to claim 6 in which uranium is the second metal.

8. A process according to claim 6 in which nickel is the first elemental metal and uranium is the second metal.

9. A process according to claim 6 in which tungsten is the first elemental metal and uranium is the second metal.

10. A process according to claim 6 in which the fibers have diameters of between about 1 and 3 microns, and contain between 5 and 40 weight percent of the second metal oxide.

References Cited

UNITED STATES PATENTS

| 2,928,780 | 3/1960 | Harteck et al. | 176—89 X |
| 3,177,578 | 4/1965 | Barr | 176—89 X |
| 3,228,849 | 1/1966 | Fellows | 176—39 |

FOREIGN PATENTS

| 583,465 | 9/1959 | Canada. |
| 792,114 | 3/1958 | Great Britain. |

OTHER REFERENCES

B.M.T.-1117 Effect of Ceramic or Metal Additives in High $UO_2$ bodies, Battelle Memorial Institute, July 24, 1956.

REUBEN EPSTEIN, Primary Examiner

U.S. Cl. X.R.

23—151; 176—89; 204—157.1